April 7, 1931. K. P. SEACORD 1,799,327
VENTILATOR
Filed April 12, 1929
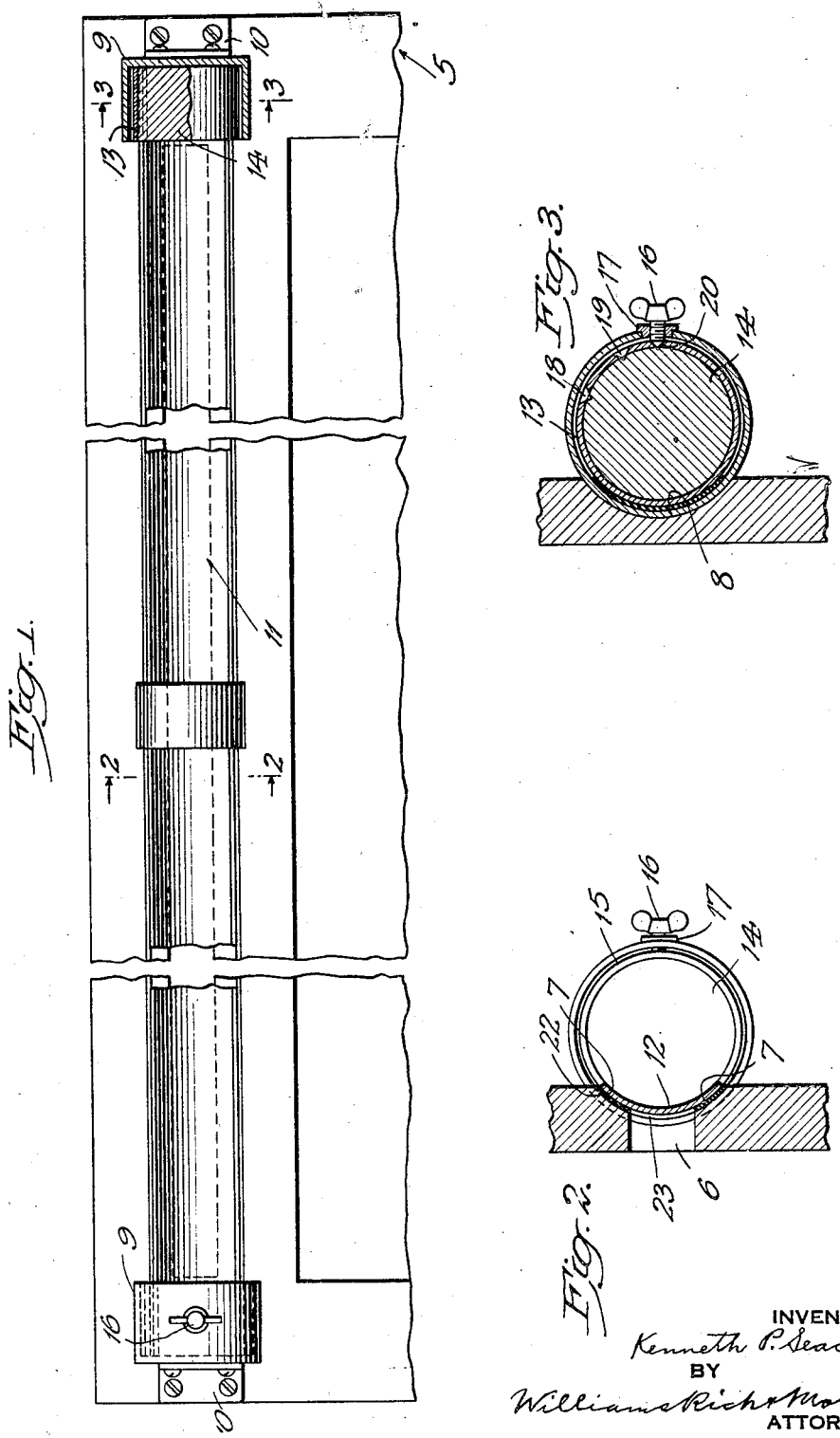
INVENTOR
Kenneth P. Seacord
BY
Williams Rich & Morse
ATTORNEYS.

Patented Apr. 7, 1931

1,799,327

UNITED STATES PATENT OFFICE

KENNETH P. SEACORD, OF NEW YORK, N. Y.

VENTILATOR

Application filed April 12, 1929. Serial No. 354,496.

This invention relates to ventilators, and has for an object to provide a ventilator which is simple in construction, effective in operation and is particularly adapted to be installed upon automobiles as an accessory or to be incorporated therein at the factory as standard equipment.

Other objects and advantages of the invention will become apparent from the following description, taken in connection with the accompanying drawings in which—

Figure 1 is a fragmental view partly in elevation and partly in section showing the device associated with an automobile windshield frame; Figure 2 is a transverse sectional view taken on line 2—2 of Figure 1; and Figure 3 is a transverse sectional view taken on line 3—3 of Figure 1.

Referring to the drawings, the numeral 5 indicates the frame of the conventional type of automobile windshield which is modified to accommodate the device embodying this invention by providing the upper frame member with a longitudinal slot which serves as a window 6, through which ventilation of the interior of the automobile may be accomplished. As shown in Figure 2, the inner face of the upper frame member of the windshield frame 5 is cut away adjacent to and longitudinally of the window 6, thus providing curved gasket-seating surfaces 7 above and below the window, against which surfaces a suitable gasket, to be hereinafter more particularly described, may be fitted.

The upper frame member of the windshield is formed with recesses 8 at opposite ends of the window 6 which are of sufficient depth and width to receive a pair of cup-like housings 9 which are arranged in alignment with their axis parallel to the window 6. To the bottoms of these housings are connected brackets 10, which brackets are suitably connected to the inner face of the windshield frame 5, and serve to rigidly anchor the housings in place.

Within the housings 9 are journalled opposite ends of a rotatable shutter 11 by which the window 6 may be opened or closed as occasion may require. This shutter includes a closure strip or member 12, which, as shown most clearly in Figure 2, is arcuate shaped in cross section. The closure strip 12 carries at its opposite ends a pair of bearing rings 13, which are adapted to rotate within the housing 9, the rings being re-inforced by inserts 14, of suitable material such as wood. To the closure strip 12 intermediate its ends is connected an arcuate shaped operating member 15, which serves to facilitate rotation of the shutter 11 to open or closed position, as desired. For locking the shutter in a given position, there is provided a pair of winged set screws 16, having screw-threaded engagement with internally screw-threaded bosses 17, or the like, secured in the side walls of the housing 9. Preferably the inner ends of the set screws 16 are pointed, as shown in Figure 3, and are adapted to enter a plurality of detents 18, 19 and 20 formed in each of the bearing rings 13, the detents 20, 19 and 18 representing respectively closed, nearly closed and fully opened positions of the closure strip 12 with respect to the window 6.

In order that a weather-tight joint between the closure strip 12 and the windshield frame may be provided, particularly when such strip is in its closed position, there is interposed between the shutter 11 and the windshield frame a suitable gasket 22, preferably of rubber, into engagement with which the shutter may be urged by the set screws 16. This gasket is formed with a longitudinal opening 23 which registers with the window 6, the upper and lower margins of the gasket being disposed upon the seating surfaces 7 of the windshield adjacent such window and its opposite ends being located on the inner surface of the walls of the housing 9 in front of the bearing rings 13. The set screws 16 serve not only to maintain tight engagement of the shutter structure with the gasket 22, but they function in cooperation with the detents 18, 19 and 20 to insure definite open and closed positions as well as an intermediate position of the shutter with respect to the window 6.

From the above description, it will be understood that should it be desired to move the shutter from its closed position, as shown, to full open position or to only partially open position, the set screws 16 are unscrewed, whereupon the operator is able to rotate the shutter through the instrumentality of the operating member 15 to the desired position. After the desired degree of opening of the shutter has been effected, the set screws are screwed inwardly until their ends engage the bottom of either the opening 19 or the opening 18, as the case may be, whereupon further inward movement of such screws serves to urge the shutter into intimate engagement with the gasket 22 and lock such shutter against undue displacement and at the same time prevent the possibility of rattling.

While I have shown only one form of the invention, it will be understood that various changes may be made without departing from the spirit of the invention or the scope of the following claims.

What is claimed is:—

1. In a ventilator for use in connection with a structure having an elongated opening serving as a window, a closure member extending across said structure longitudinally of said opening and rotatably supported with respect to said opening whereby it may be moved into and out of alignment with said opening, said closure being movable radially with respect to its axis, and pressure means for urging said closure member when such member is in alignment with said opening into close relation to said structure at points adjacent said opening.

2. In a ventilator for use in connection with a structure having an elongated opening serving as a window, a gasket associated with said structure and located adjacent said opening, a closure member extending across said structure longitudinally of said opening and rotatably supported with respect to said opening whereby it may be moved into and out of alignment with said opening, said closure being movable radially with respect to its axis, and pressure means for urging said closure member when such member is in alignment with said opening into intimate engagement with said gasket.

3. In a ventilator for use in connection with a structure having an opening serving as a window, a pair of housings associated with said structure, a closure member rotatably supported within said housings and extending across said structure longitudinally of said opening, said closure member being adapted to be moved into and out of alignment with said opening, and pressure means for urging said closure member when in alignment with said opening into close relation to said structure at points adjacent said opening.

4. In a ventilator for use in connection with a structure having an opening serving as a window, a pair of housings associated with said structure, a closure member rotatably supported within said housings and extending across said structure longitudinally of said opening, said closure member being adapted to be moved into and out of alignment with said opening, a gasket associated with said structure and located adjacent said opening, and pressure means for urging said closure member when in alignment with said opening into intimate engagement with said gasket.

5. In a ventilator for use in connection with a structure having an opening serving as a window, a pair of housings associated with said structure, a closure member rotatably supported within said housings and extending across said structure longitudinally of said opening, said closure member being adapted to be moved into and out of alignment with said opening, a gasket extending along the margin of said opening and having its ends located within said housings, and pressure means for urging said closure member when in alignment with said opening into intimate engagement with said gasket and for locking said closure member against rotation with respect to said housings.

6. In a ventilator for use in connection with a structure having an opening serving as a window, said structure having seating surfaces at opposite sides of said opening and adjacent thereto, a pair of housings located at opposite ends of said opening, a closure strip adapted to be moved into and out of closed position with respect to said opening and terminating in bearing rings rotatably mounted within said housings, a gasket associated with said structure and carried by said seating surfaces, and pressure means for urging said closure strip into intimate engagement with said gasket regardless of whether such closure strip is in open or closed position with respect to said opening and for securing said closure strip against rotation with respect to said housings.

In testimony whereof, I have affixed my signature to this specification.

KENNETH P. SEACORD.